United States Patent
Rampen et al.

(10) Patent No.: US 9,033,309 B2
(45) Date of Patent: May 19, 2015

(54) VALVE ACTUATOR

(75) Inventors: William Hugh Salvin Rampen, Edinburgh (GB); Niall James Caldwell, Edinburgh (GB); Uwe Bernhard Pascal Stein, Edinburgh (GB)

(73) Assignees: Sauer Danfoss Aps, Nordborg (DK); Artemis Intelligent Power Ltd., Loanhead (GB)

( * ) Notice: Subject to any disclaimer, the term of this patent is extended or adjusted under 35 U.S.C. 154(b) by 328 days.

(21) Appl. No.: 13/126,631
(22) PCT Filed: Oct. 27, 2009
(86) PCT No.: PCT/DK2009/000226
§ 371 (c)(1),
(2), (4) Date: Jun. 30, 2011
(87) PCT Pub. No.: WO2010/048954
PCT Pub. Date: May 6, 2010

(65) Prior Publication Data

US 2011/0253918 A1 Oct. 20, 2011

(30) Foreign Application Priority Data

Oct. 29, 2008 (EP) .................................... 08018862

(51) Int. Cl.
*F16K 31/08* (2006.01)
*H01F 7/08* (2006.01)
(Continued)

(52) U.S. Cl.
CPC ............. *H01F 7/081* (2013.01); *F04B 7/0076* (2013.01);
(Continued)

(58) Field of Classification Search
CPC ......... H01F 7/081; H01F 7/1615; H01F 7/13; F16K 31/082; F04B 49/246; F04B 7/0076
USPC ........ 251/65, 129.15; 335/227, 297, 302, 304
See application file for complete search history.

(56) References Cited

U.S. PATENT DOCUMENTS 3,683,239 A 8/1972 Sturman
4,253,493 A * 3/1981 English .................... 137/625.65
(Continued)

FOREIGN PATENT DOCUMENTS

DE 3939537 A1 6/1991
DE 4334031 A1 4/1995
(Continued)

OTHER PUBLICATIONS

International Search Report for PCT/DK2009/000226 dated Dec. 18, 2009.

*Primary Examiner* — Eric Keasel
(74) *Attorney, Agent, or Firm* — McCormick, Paulding & Huber LLP

(57) ABSTRACT

The invention relates to a valve actuator (2), comprising a magnetic core (6) with an interspace (8) and at least one bifurcating branch (7), at least one variable magnetic field generating device (16), at least one permanent magnetic field generating device (13) and at least one movable magnetic component (12), wherein the bifurcating branch (7) defines a first region (4) and a second region (5) of said magnetic core (6). Said movable magnetic component (12) is movably arranged within said interspace (8) of said magnetic core (6) in such a way that a first gap (19) is formed between a first surface (23) of said movable magnetic component (12) and a first surface (22) of said interspace (8) of said magnetic core (6), a second gap (20) is formed between a second surface (24) of said movable magnetic component (12) and a second surface (25) of said interspace (8) of said magnetic core (6), and a third gap (21) is formed between a third surface (27) of said movable magnetic component (12) and a third surface (26) of said bifurcating branch (7) of said magnetic core (6). At least one of said variable magnetic field generating devices (48, 49) is associated with said first region (4) of said magnetic core (6) and at least one of said permanent magnetic field generating devices (13) is associated with said second region (5) of said magnetic core (6). Said valve actuator (2) is designed and arranged in a way that a magnetic flux, generated by at least one at least one of said variable magnetic field generating devices (16) is able to exert a force on said at least one movable magnetic component (12) and is able to cancel the magnetic flux (48, 49), generated by at least one of said permanent magnetic field generating devices (13). At least one magnetic flux limiting means (7, 12) is provided, whose magnetic flux limit can be reached or exceeded.

17 Claims, 6 Drawing Sheets

(51) Int. Cl.
    *F04B 7/00*     (2006.01)
    *F04B 49/24*     (2006.01)
    *H01F 7/13*     (2006.01)
    *H01F 7/16*     (2006.01)

(52) U.S. Cl.
    CPC ............. *F04B 49/246* (2013.01); *F16K 31/082* (2013.01); *H01F 7/13* (2013.01); *H01F 7/1615* (2013.01)

(56) References Cited

U.S. PATENT DOCUMENTS

| | | | | |
|---|---|---|---|---|
| 4,403,765 | A | * | 9/1983 | Fisher .............................. 251/65 |
| 4,534,539 | A | | 8/1985 | Dettmann |
| 4,660,012 | A | | 4/1987 | Bonniau et al. |
| 4,730,175 | A | | 3/1988 | Ichikawa et al. |
| 4,994,776 | A | | 2/1991 | Juncu |
| 5,029,807 | A | * | 7/1991 | Fuchs .............................. 251/65 |
| 5,034,714 | A | * | 7/1991 | Bratkowski et al. .......... 335/234 |
| 6,229,421 | B1 | | 5/2001 | Floyd et al. |
| 6,351,199 | B1 | | 2/2002 | Perini |
| 6,615,780 | B1 | * | 9/2003 | Lin et al. ................... 251/129.15 |
| 6,737,946 | B2 | * | 5/2004 | Seale et al. ................ 251/129.15 |
| 6,791,442 | B1 | | 9/2004 | Schmidt |
| 7,077,378 | B2 | | 7/2006 | Rampen et al. |
| 7,091,807 | B2 | * | 8/2006 | Tanimizu et al. ............. 335/220 |
| 7,605,680 | B2 | * | 10/2009 | Matsumoto et al. .......... 335/229 |
| 8,272,622 | B2 | * | 9/2012 | Caldwell ................... 251/129.15 |

FOREIGN PATENT DOCUMENTS

| | | |
|---|---|---|
| EP | 0361927 A1 | 4/1990 |
| EP | 0494236 A1 | 7/1992 |
| EP | 1507271 A2 | 2/2005 |
| EP | 1537333 | 6/2005 |
| EP | 1857720 A2 | 11/2007 |
| GB | 2099223 A | 12/1982 |
| GB | 2213650 A | 8/1989 |
| JP | 58075806 A | 5/1983 |
| JP | 1082606 A | 3/1989 |
| WO | 9100516 A1 | 4/1991 |
| WO | 2004025122 A1 | 3/2004 |
| WO | 2007064535 A1 | 6/2007 |
| WO | 2007128977 A2 | 11/2007 |

* cited by examiner

VALVE ACTUATOR

CROSS REFERENCE TO RELATED APPLICATIONS

This application is entitled to the benefit of and incorporates by reference essential subject matter disclosed in International Patent Application No. PCT/DK2009/000226 filed on Oct. 27, 2009 and European Patent Application No. 08018862.6 filed on Oct. 29, 2008.

FIELD OF THE INVENTION

The invention relates to a valve actuator, comprising a magnetic core with an interspace and at least one bifurcating branch, at least one variable magnetic field generating device, at least one permanent magnetic field generating device, at least one movable magnetic component and at least one magnetic field intensity limiting means. The invention also relates to an actuated valve, comprising a valve actuator, as well as to a fluid working machine, comprising at least one valve actuator and/or one actuated valve. Furthermore, the invention relates to a method of operating a valve actuator, comprising a magnetic core with an interspace, at least one variable magnetic field generating device, at least one permanent magnetic field generating device, at least one movable magnetic component and at least one magnetic field intensity limiting means.

BACKGROUND OF THE INVENTION

Valves are nowadays used for a plethora of technical applications. They are used, for example, for opening or closing fluid connections between two points, or to selectively distribute fluid, entering the valve one side, to one or several of a plurality of fluid outlets of the valve. Not only flowing liquids are influenced by such valves, but also gases, liquids, mixtures of gases and liquids, mixtures of gases and solid particles (smoke), mixtures of liquids and solid particles (suspension) or even mixtures of gases, liquids and solid particles.

Generally speaking, two different kinds of valves exist: passive valves and active valves.

Passive valves generally change their position under the influence of the fluid itself. An example: spring loaded poppet valves, which open in one direction under the influence of a pressure difference between the fluid inlet port and the fluid outlet port of the valve. In the opposite direction, however, they remain closed irrespective of the pressure difference.

Active valves change their position under the influence of an externally applied actuation signal. In principle, the actuation signal can be the manual input of an operator. If the actuation of the valve has to be automated in some way, however, an automated way of actuating the valve is required. In the state of the art, several methods of actuating an actuated valve are known. For example, the actuated valve can be actuated by mechanical means. An example for this is the actuation of the valves of a combustion engine of a motor vehicle, where the valves are usually actuated mechanically by cams, mounted on a camshaft.

Another common way of applying an actuation signal to an actuated valve is the use of an electric current. This is particularly useful, when the actuation of the valves is controlled by an electric or electronic controlling unit. Here, the controlling unit will always generate an electric output signal initially. If a valve is used, which needs an actuation signal different from an electric current, an additional device is needed for converting the electric actuation signal into a different form of actuation signal. Of course, this is not desired.

Furthermore, an electric actuation of valves is quite often preferred, because such actuated valves are normally comparatively fast and accurate. Also, electric signals can be amplified easily.

Valve actuators for actuating valves, which use an electric current as an actuation signal, are known in the state of the art.

In GB 2 213 650 A, for example, a fuel injection valve is described, which can be actuated by externally applied electric signals. The fuel injection valve, disclosed in GB 2 213 650 A, includes an outer body and a core member extending within the body. The body and core member are formed from magnetizable material and define pole faces presented to a valve member which is spring biased into contact with a seating. Interposed between the body and core member is a permanent magnet which drives magnetic flux through the core member and body. The flux produced by the magnet is sufficient to hold the valve member in contact with pole faces, but not sufficient to lift the valve member from the seating. The flux produced by the magnet is enhanced when a first coil is energized to lift the valve member. When a second coil is energized the flux produced by the magnet is opposed to allow the spring to return the valve to the seating.

In WO 2007/128977 A2 another electro magnetic actuator is disclosed. The electro magnetic actuator comprises a core, a ferromagnetic component movable in a gap in the core, and a permanent magnet for attracting the component to one side of the gap. A flux concentrator concentrates the magnetic flux on that side of the gap and a main solenoid produces a magnetic flux in the gap. A magnetic circuit of the solenoid is defined by part of the core, part of the gap and by a further gap between the ferromagnetic component and the core. A demagnetizing coil has a magnetic circuit defined by another part of the core, another part of the gap and by the further gap. The demagnetizing coil is arranged to demagnetize the permanent magnet at least to the extent that the magnetic flux produced by the main solenoid is diverted from the flux concentrator into the further gap and the movable component is movable away from the permanent magnet under the magnetic force of the main solenoid. The current in the main solenoid, and therefore the magnetic force derived from it, rises relatively slowly. This is due to the size of the main solenoid which has to be of a large size to generate enough force to move the movable ferromagnetic component quickly. The demagnetizing coil is activated after the main solenoid has reached a high current, so that it is able to move the movable ferromagnetic component quickly.

In those actuators, two different coils are used. The presence of two different coils increases the actuators in size and weight. Furthermore, the actuators become more complex and more expensive. Another problem is that the generation and application of the different actuation signals can be difficult to achieve. Another problem can arise if the valve actuators are used for special technical fields. For example, in the field of hydraulic fluid working machines, more precisely in the field of synthetically commutated hydraulic fluid working machines, the requirements for the valve actuators are very stringent. Firstly, the valve actuators have to be very fast when opening or closing. Secondly, the response to the actuation signal (opening and closing) has to be very accurate and reproducible. Thirdly, the valve actuators have to be able to produce relatively strong forces. In particular, the holding force in the open position has to be relatively high (in the order of 80 N) to avoid self-closing of the valve due to flow forces, acting on the valve head especially at high rotational speeds and high oil viscosities. Of course, the power consumption of the valve actuator should be as low as possible.

In U.S. Pat. No. 7,077,378 B2, a valve assembly operable to allow or prevent the flow of fluid to or from a working chamber of a fluid-operated machine, comprising radially spaced apart inner and outer annular valve seats defining an annular passage therebetween, a valve member comprising a sealing ring, and means for moving the valve member axially between a first position in which the sealing ring is in seating engagement with the annular valve seats to close the annular passage to fluid flow therethrough and a second position in which the sealing ring is spaced from the annular valve seats so that the annular passage is open to fluid flow therethrough, is disclosed. The valve assembly comprises a body of a ferrous material. A movable pole member, commonly referred to as an armature is movably arranged within a gap of said body. Said movable pole member can be latched to said second position by a permanent magnet. By application of an electric current to a coil, said movable pole member can be delatched and moved to said first position. The middle "bridge" portion of the body, leading sideways to the movable pole member is dimensioned in a way that it cannot be driven into saturation, even if the maximum allowable current through the coil is applied. However, due to the finite gap between the bridge portion of the magnetic core and the body, a certain constant resistivity towards the penetration of magnetic flux is present. Therefore, a constant fraction (as long as the movable pole member has not yet moved) of the magnetic flux, generated by the electric coil, is going through the permanent magnet part of the magnetic core.

By the notion fluid working machines, hydraulic pumps, hydraulic motors, and machines, which can be used as pumps and as motors, are encompassed. Synthetically commutated hydraulic machines are also known as "digital displacement pumps". Synthetically commutated hydraulic machines are known from EP 0361927 B1, EP 0494236 B1 and EP 1537333. They are a special subset of variable displacement fluid working machines.

Although such fluid working machines and/or such synthetically commutated hydraulic machines work well, both in theory and practical applications, there is still plenty of room for improvement, in particular for improvement in the field of the valve actuators.

SUMMARY OF THE INVENTION

Therefore, the object of the present invention is to suggest improved valve actuators. Another object of the present invention is to provide for improved actuated valves, for improved fluid working machines, as well as for a method of operating a valve actuator.

It is therefore suggested to design a valve actuator, comprising a magnetic core with an interspace and at least one bifurcating branch, at least one variable magnetic field generating device, at least one permanent magnetic field generating device and at least one movable magnetic component, wherein said bifurcating branch defines a first region and a second region of said magnetic core, wherein said movable magnetic component is movably arranged within said interspace of said magnetic core in such a way that a first gap is formed between a first surface of said movable magnetic component and a first surface of said interspace of said magnetic core, a second gap is formed between a second surface of said movable magnetic component and a second surface of said interspace of said magnetic core, and a third gap is formed between a third surface of said movable magnetic component and a third surface of said bifurcating branch of said magnetic core, wherein at least one of said variable magnetic field generating devices is associated with said first region of said magnetic core and at least one of said permanent magnetic field generating devices is associated with said second region of said magnetic core, wherein said valve actuator is designed and arranged in a way that a magnetic flux, generated by at least one of said variable magnetic field generating devices is able to exert a force on said at least one movable magnetic component and is able to cancel the magnetic flux, generated by at least one of said permanent magnetic field generating devices, in a way that at least one magnetic flux limiting means is provided, whose magnetic flux limit can at least be reached. Usually, the first gap will be associated with the first region, while the second gap will usually be associated with the second region. However, different design can prove sensible as well. Also, the third gap and/or the bifurcating branch can usually be considered as being associated with both regions. The permanent magnetic field generating device will usually provide for the latching of the removable magnetic component in at least one position. The variable magnetic field generating device will usually not only be used for cancelling the magnetic field, generated by the permanent magnetic field generating device, but also for generating an additional force in the direction of the force, generated by the permanent magnetic field generating device and/or for generating a force in a different, in particular an opposite direction of the direction of the force, generated by the permanent magnetic field generating device. As a permanent magnetic field generating device, standard permanent magnets can be used. For volume reasons, preferably permanent magnets, showing a high magnetic field per unit volume of the permanent magnet are used. For the variable magnetic field generating device, electric coils will normally be used. The actual design of the electric coil depends on the strength of the magnetic field to be produced, as well as on the space available and/or on external parameters, like the available electric current or electric voltage. The movable magnetic component can preferably be a part of a valve poppet or can later be connected to a valve poppet. Of course, it is not necessary that the movable magnetic component is completely manufactured of magnetic material. On the contrary, normally only a part of the movable magnetic component will be made of a magnetic material. The dimension of the movable magnetic component (at least considering its portion, being arranged within the interspace) can be chosen in a way that its respective dimension is smaller than the length of the interspace. For example the length of the interspace may be aligned with the axis of said valve actuator. Therefore the movable magnetic component can be moved in the "direction" of the interspace. Generally, the difference between the length of the movable magnetic component and the length of the interspace will determine the moving distance of the movable magnetic component.

The distribution of the magnetic flux, generated by the variable magnetic field generating device(s) (and of the magnetic flux, generated by the permanent magnetic field generating device(s)) is distributed between the two regions of the magnetic core, where the distribution of the magnetic flux, in particular the magnetic flux, generated by the variable magnetic field generating device(s), is distributed between the two regions, depending on the magnetic flux, in particular of the magnetic flux, generated by the variable magnetic field generating device(s). In particular, at low magnetic fluxes (e.g. at low electric currents through an electric coil) the magnetic flux, generated by the variable magnetic field generating device(s), will be essentially confined to the first region of the magnetic core, while the magnetic flux, generated by the permanent magnetic field generating device(s) will be essentially confined to the second region of the magnetic core. If, however, the magnetic flux, generated by the variable magnetic field generating device, will exceed the magnetic flux limit of the magnetic flux limiting means, the exceeding part of the magnetic flux, in particular of the magnetic flux, generated by the variable magnetic field generating device, will go through the second region of the magnetic core (at least, if the magnetic field, generated by the variable magnetic field generating device, points in a certain direction). Therefore, due to the magnetic flux limiting means, the distribution of the magnetic fluxes, generated by the various magnetic field generating devices, will be distributed over the different regions of the magnetic core in a non-linear way. The magnetic flux limiting means can be preferably arranged in connection with said bifurcating branch, in particular in connection with said third gap. It can even form a part of said bifurcating branch and/or said third gap. Of course, the magnetic flux limiting means does not have to show a sharp cut-off behaviour for the magnetic flux, when the magnetic flux limit of the magnetic flux limiting means is reached. Instead, a "soft" cut-off behaviour, or even simply a non-linear cut-off behaviour of the magnetic flux limiting means can prove to be sufficient for this purpose. For example, if the magnetic flux limiting means is arranged in connection with the bifurcating branch and the magnetic fluxes, generated by the permanent magnetic field generating device and the variable magnetic field generating device, will sum up to a magnetic flux, exceeding the magnetic flux limit of the magnetic flux limiting device, the excess magnetic flux in excess of this magnetic flux limit has to look for a path to follow, which is different from the bifurcating branch. A preferred alternative path, however, is already present in the form of the second region of the magnetic core.

Using a magnetic flux limiting means, as suggested, it is possible to use variable magnetic field generating devices, which show a slow change in the magnetic flux they generate. However, such a slow change in the magnetic flux is the standard behaviour of typical variable magnetic field generating devices, like electric coils. Using the proposed design, however, the variable magnetic field generating device can slowly build up a magnetic flux through the first region of the valve actuator. This way a significant attractive force across the first gap of the valve actuator can be built up. However, since the magnetic flux through the second region of the valve actuator is not (yet) influenced by the magnetic flux generated by the variable magnetic field generating device (as long as the magnetic flux limit of the magnetic flux limiting device is not yet reached), the magnetic flux generated by permanent magnetic flux generating device can hold the movable magnetic component in it's latched position, despite of the external forces acting on the movable magnetic component and the magnetic flux generated by the variable magnetic field generating device. When the magnetic flux limit is reached the cancellation of the magnetic flux generated by the permanent magnetic field generating device will rapidly occur and the movable magnetic component will be rapidly accelerated, since a significant attractive force across the first gap is already present. Hence it is possible to achieve a higher initial acceleration of the movable magnetic component and therefore a faster actuation time of the valve actuator, as compared to previously known valve actuators. Furthermore, the time of the actuation of the valve actuator is usually much more precise, as compared to previously known valve actuators. When talking about a cancellation of the magnetic flux generated by permanent magnetic field generating device, a complete cancellation is not necessarily occurring. Instead, it is well possible that the movement of the movable magnetic component will be initiated despite of a residual magnetic flux across the second gap and/or within the second region of the magnetic core, for example.

Preferably, said magnetic flux intensity limit of at least one of said magnetic flux limiting means is essentially defined by the saturation of said magnetic flux limiting means. Using standard ferromagnetic materials, a magnetic saturation will occur at some point, due to the physical properties of the material used. Above the magnetic saturation limit the magnetic reluctance of the ferromagnetic material usually increases markedly, generally becoming approximately equivalent to the reluctance of air. This normally means that above the saturation limit the incremental magnetic reluctance is increased, as compared to the situation below the saturation limit, where the incremental magnetic reluctance is lower. The magnetic flux limit of the magnetic flux limiting means can then be chosen by an appropriate dimensioning of the respective part. However, different embodiments are also possible.

In a preferred embodiment of said valve actuator, said magnetic flux limiting means is designed as a variable magnetic flux limiting means. In other words, the magnetic flux limit, imposed by the magnetic flux limiting means, can be variable. This way, it is possible, to additionally change the previously mentioned distribution of the magnetic flux over the different regions of the magnetic core. For example, it is possible to concentrate the magnetic flux generated by the variable magnetic flux generating device to the first region of the valve actuator, once the magnetic latch due to the magnetic flux generated by the permanent magnetic field generating device has been cancelled and the movable magnetic component has already moved slightly. This is because the attractive magnetic force across the gap (for example the second gap) will usually rapidly decay with an even slight increase in the size of the respective gap in the initial phase. Therefore, it is possible to reduce the magnetic flux generated by the permanent magnetic field generating device through the second region after a very short time (e.g. moving distance of the movable magnetic component). Additionally, the part of the magnetic flux generated by the variable magnetic fields generating device, which is taking the "longer" path through second region can decrease. Therefore, the magnetic flux in the first region of the valve actuator and/or across the first gap of the valve actuator can be increased. This increase of the magnetic flux in the first region can be even larger, if the magnetic flux across the third gap increases by raising the magnetic flux limit of the magnetic flux limiting means. By this, the attractive force across the first gap can be increased, resulting in an improved acceleration of the movable magnetic component, for example. Therefore, the valve actuator can be even faster. Preferably, the magnetic flux limit can change with the position of the movable magnetic component. Therefore, in different positions of the movable magnetic component, emphasis can be placed on certain actions to be performed. For example, in a latching position of the movable magnetic component (wherein the latching is performed by means of the permanent magnetic field generating device) an emphasis can be put on cancelling (or sufficiently decreasing) the magnetic flux of the permanent magnetic field generating device, thus putting an emphasis on delatching. Once the movable magnetic component is released, however, the emphasis can shift towards a rapid acceleration of the movable magnetic component in a direction, away from the latching position.

It is possible to arrange said magnetic flux limiting means, in particular said variable magnetic flux limiting means, in connection with said bifurcating branch, preferably in connection with said third gap. This way, the (variable) magnetic flux limiting action can easily be realized by an appropriate dimensioning of the respective device and/or by an appropriate choice of the magnetic material and/or by the appropriate shaping of the respective device.

Usually, it is preferred to design and arrange the valve actuator in a way that the magnetic flux limit and/or the magnetic reluctance of at least one of said magnetic flux limiting means, in particular of said variable magnetic flux limiting means, preferably of said third gap changes with the position of said movable magnetic component. This way, the previously described dependency of the distribution of the magnetic fields over the different regions of the magnetic core cannot only depend on the different amounts of the magnetic fluxes involved, but also on the position of the movable magnetic component. Using such an embodiment, it is possible, for example, to provide for an even more elaborate functionality between the position of the movable magnetic component and the magnetic force, exerted on the movable magnetic component. This functionality can be easily provided by an inclined or stepwise shaping of surfaces, neighbouring one (or more) of the gaps. For example, the surfaces of the bifurcating branch and/or the surface of the movable magnetic component, heading towards the third gap, can show an inclined and/or step like shaping. Additionally or alternatively it is also possible to arrange the components in a way that the surface overlap of the respective surfaces changes with a movement of the movable magnetic component. Of course, different ways of realising said functionality are also possible. Particularly in connection with the presently suggested embodiment, it is usually preferred if the direction of movement of the movable magnetic component is essentially parallel to at least a part of at least one of the surfaces, neighbouring the third gap (i.e. the respective surface of the movable magnetic component and/or the respective surface of the bifurcating branch of the magnetic core). Using the presently suggested embodiment, it is possible to provide for the magnetic flux limit of said variable magnetic flux limiting means to increase with a movement of the movable magnetic component away from its latched position, thus increasing the magnetic flux in the first region, generated by the variable magnetic field generating device, and therefore increasing the force motivating the movement of the movable magnetic component. This way, the magnetic flux generated by the variable magnetic field generating device can be used for generating attractive forces, instead of being used for cancelling the magnetic flux of the permanent field generating device, although this cancellation it is no longer necessary (the attractive force of the permanent magnetic field generating device decays quickly with increasing size of the first gap). However, it is not necessary to raise the usually sharp cut-off level of the magnetic flux limiting means. Instead, even a comparatively "soft" decrease in magnetic reluctance can prove to be sufficient. Using the presently suggested embodiment, it is furthermore possible to provide for a decreasing fraction of the magnetic flux generated by the variable magnetic field generating device(s) going through the second region (and therefore through the permanent magnetic field generating device), thus enhancing the fraction of the magnetic flux generated by the variable magnetic field generating device going solely through the first region of the magnetic core. Furthermore, by this design, it is even possible to protect the permanent magnetic field generating device, since the amount of an externally applied magnetic flux (normally applied by the variable magnetic field generating devices), being opposite to the direction of the magnetization of the permanent magnet field generating device can be limited. This is advantageous, because many permanent magnetic field generating devices can be destroyed, if a too strong magnetic flux of an opposite direction to the direction of magnetization of the permanent magnet field generating device is applied to the permanent magnet field generating device.

Usually it is preferred, if said valve actuator is designed and arranged in a way that magnetic flux limit of said magnetic flux limiting means, in particular of said variable magnetic flux limiting means, preferably of said third gap, is lower, and/or the magnetic reluctance of said magnetic flux limiting means, in particular of said a variable magnetic field limiting means, preferably of said third gap, is higher when the movable component is closer to said second gap. This way, the cancellation of the magnetic flux of the permanent magnetic field generating device, and therefore the latching action of the permanent magnetic field generating device, can be cancelled very effectively. On the other hand, the fraction of the magnetic flux, generated by the variable magnetic field generating device, going through the second region of the magnetic core, can decay rapidly once the movable magnetic component has started to move.

The valve actuator can be designed in a way that at least one magnetic flux concentrating device is arranged in the proximity of at least one of said gaps and/or in the proximity of at least one of said magnetic flux limiting means, in particular in the proximity of at least one of said variable magnetic flux limiting means, preferably in the proximity of said second gap and/or in the proximity of said third gap of said magnetic core. This way, it is possible to maximize the force generating effect of the respective magnetic flux, thus enabling to lower the amount of the respective magnetic flux. This way, it is possible to conserve electrical energy (used for generating an opposing magnetic flux and/or for cancelling an opposing magnetic flux, for example). Additionally, a variable magnetic flux limiting means can be realised by such a magnetic flux concentrating device. Furthermore, by using magnetic flux concentrating devices, it can even be possible to realize a force-over-way behaviour, so that the force generated by the magnetic flux rapidly decays with increasing distance of the respective parts. In connection with the permanent magnetic field generating device, it is possible to arrange the permanent magnetic field generating device in the proximity of at least one of said magnetic flux concentrating devices. It is even possible, to at least in part combine the functionality of a permanent magnetic field generating device and of a magnetic flux concentrating device. This can be done, for example, by an appropriate shape of the permanent magnetic field generating device. However, not only in connection with a permanent magnetic field generating device, a magnetic flux concentrating device can be realized by a sensible shaping of certain devices, for example by a sensible shaping of parts of the magnetic core and/or of the movable magnetic component. Providing magnetic flux concentrating devices in the proximity of the second gap and/or in the proximity of the third gap can be particularly useful, since these gaps are usually associated with the second region of the magnetic core, defining the region, in which the magnetic field of the permanent magnetic field generating device is normally confined.

It is possible to provide at least one of said magnetic flux concentrating devices and/or at least one of said magnetic flux limiting means, in particular at least one of said variable magnetic flux limiting means by shaping at least one of the components. This is usually a very easy way to provide for magnetic flux concentrating devices and variable magnetic flux limiting means, respectively. In particular, a tapering shape of the respective component is normally effective. The respective components can be parts of the magnetic core (in particular those surface parts of the magnetic core, forming the neighbouring surface of one the first gap, second gap, third gap and/or variable magnetic flux limiting means), of the movable magnetic component and/or of the permanent magnetic field generating device.

Another possible embodiment can be achieved, if said magnetic flux limiting means, in particular said variable magnetic flux limiting means are arranged solely in said first region of said magnetic core, preferably in the region of said bifurcating branch. This design can prove to be particularly useful, because this way the magnetic flux, particularly the magnetic flux generated by variable magnetic field generating device can be easily confined to the first region of the magnetic core at low magnetic fluxes. If, however, the magnetic flux exceeds the limit, defined by the magnetic flux limiting means, the magnetic flux will then "leave" the first region by virtue of the magnetic flux limiting means, thus entering the second region. This, however, is usually the preferred distribution of the magnetic fluxes over the regions of the magnetic core if the cancellation of the magnetic flux is desired. In particular, this way the cancellation of the magnetic flux generated by the permanent magnetic field generating device and/or the cancellation of the latching force of the movable magnetic component can be particularly efficient and/or the timing of the movement of the movable magnetic component can be very precise. This way, a valve actuator with an advantageous behaviour can be provided.

It is also possible to design the valve actuator in a way that at least one of said gaps, in particular said first gap and/or said second gap comprises at least one magnetic flux enhancing means and/or at least one magnetic flux density reducing means. Using such a design, the reluctance of the respective gap towards the penetration of magnetic field lines can be reduced. Furthermore, the use of such a design will generally result in a lower dependence of the magnetic reluctance of the respective gap on the size of the gap. This way, the force generated across the respective gap can be more consistent. Such a magnetic flux enhancing means and/or magnetic flux density reducing means can be realized by enlarging and/or aligning the respective surfaces, for example. A possible way to do this is to provide for an inclined "cutting plane" for the gap and/or to provide for cone shaped features on the first surface of the moveable magnetic component and/or on the first surface of the magnetic core, i.e. within the gap.

It is also possible to provide the valve actuator with at least one mechanical energy storage device, in particular with an elastically deformable device like a spring. This way, kinetic energy of the movable magnetic component and/or external forces (e.g. exerted by hydraulic fluid), acting on the movable magnetic component can be converted into storable energy. This storable energy can be released at a later time during the working cycle of the valve actuator. If the stored energy is released at an appropriate time, it is possible, for example, to decrease the opening and/or closing time of the valve actuator. Furthermore, the stored mechanical energy can be used for decreasing the amount of energy, necessary for driving the valve actuator. Therefore, energy can be conserved.

Another possible embodiment of the valve actuator can be achieved, if said moveable magnetic component can be at least moved into a first end position, where the first gap is essentially closed, and/or a second end position where the second gap is essentially closed. Particularly in the proposed end positions, the magnetic fluxes usually generate the highest forces. Seen vice-a-versa, a certain force can be produced with a comparatively low magnetic flux. Since the valve actuator usually remains in the end positions most of the time during a working cycle of the valve actuator, the overall energy consumption of the valve actuator can be reduced significantly, if the energy consumption of the valve actuator in one or both end positions is reduced. Therefore, a particularly energy saving valve actuator can be achieved.

Furthermore, it is possible to provide the valve actuator with at least one bearing means, wherein at least one of said bearing means is preferably arranged in connection with said third gap. Using such bearing means, the movement of the movable magnetic component can be more exact. Therefore, the actuation of the valve, driven by the proposed valve actuator, can be more exact as well. In particular, the proposed bearings can be translational bearings. It is to be noted that in the vicinity of the third gap, there are normally surfaces (or at least surface parts) present, which are at least essentially parallel to the moving direction of the movable magnetic component. These surfaces (or surface parts) can conveniently be used for providing a translational bearing. In case the magnetic material in the vicinity of the third gap shows an inclined or step like surface, a smooth and parallel surface can be provided by the addition of material on (part of) the surface of the magnetic material. For example, an epoxy resin could be used. An additional asset of the proposed embodiment is that the overall volume for the valve and/or for the actuator can be reduced, particularly if certain components have a "double function".

Additionally it is proposed to provide an actuated valve with a valve actuator of the previously described type. Preferably, at least one of said movable magnetic components is connected to and/or a part of a valve orifice changing device. The resulting actuated valve can show the previously mentioned and described features and advantages, analogously. A valve orifice changing device can easily be designed as an orifice, which can be partly opened or closed by a valve head, in particular by a valve poppet. Preferably, a first end position of the valve actuator can correspond to a fully open position of the actuated valve, while a second end position can correspond to a fully closed position of the actuated valve. However, the connection between the valve actuator's position and the valve orifice's state can be different, in particular vice versa as well.

Furthermore, a fluid working machine is suggested, which comprises at least one valve actuator of the previously described type and/or at least one actuated valve of the previously described type. Preferably, the fluid working machine is at least partially designed as a hydraulic fluid working machine, in particular as a synthetically commutated hydraulic machine. Fluid working machines usually encompass fluid pumps, fluid motors, and machines, which can be both operated as fluid pumps and/or fluid motors. Synthetically commutated hydraulic machines are also known as digital displacement pumps. They form a subset of variable displacement fluid working machines. The proposed fluid working machine can show the already described features and advantages in an analogous way.

Furthermore, a method of operating a valve actuator, comprising a magnetic core with an interspace, at least one variable magnetic field generating device, at least one permanent magnetic field generating device and at least one movable magnetic component, wherein said movable magnetic component is movably arranged within said interspace of said magnetic core in such a way that a first gap is formed between a first surface of said movable magnetic component and a first surface of said interspace of said magnetic core, and a second gap is formed between a second surface of said movable magnetic component and a second surface of said interspace of said magnetic core is proposed, wherein the magnetic flux, generated by at least one of said permanent magnetic field generating devices is at least in part temporarily cancelled by at least one of said variable magnetic field generating devices through a limitation of magnetic flux through part of said magnetic core and/or part of said movable magnetic component. The underlying principles of this method have already been described in connection with the proposed valve actuator, the proposed actuated valve and/or the proposed fluid working machine. The proposed method shows the already described features and advantageous in an analogous way.

It is possible to perform the proposed method for operating a valve actuator of the previously described type in a way that the amount of said magnetic flux limitation is at least in part variable, and is preferably changing with the position of said movable magnetic component.

It is also possible to use the proposed method for operating a valve actuator of the previously described type. Furthermore, it is possible to further modify the proposed method in a way suggested by the previous description.

BRIEF DESCRIPTION OF THE DRAWINGS

The present invention and its advantages will become more apparent, when looking at the following description of embodiments of the invention, which will be described with reference to the accompanying figures, which are showing.

DETAILED DESCRIPTION OF THE PREFERRED EMBODIMENTS

Figure 1:
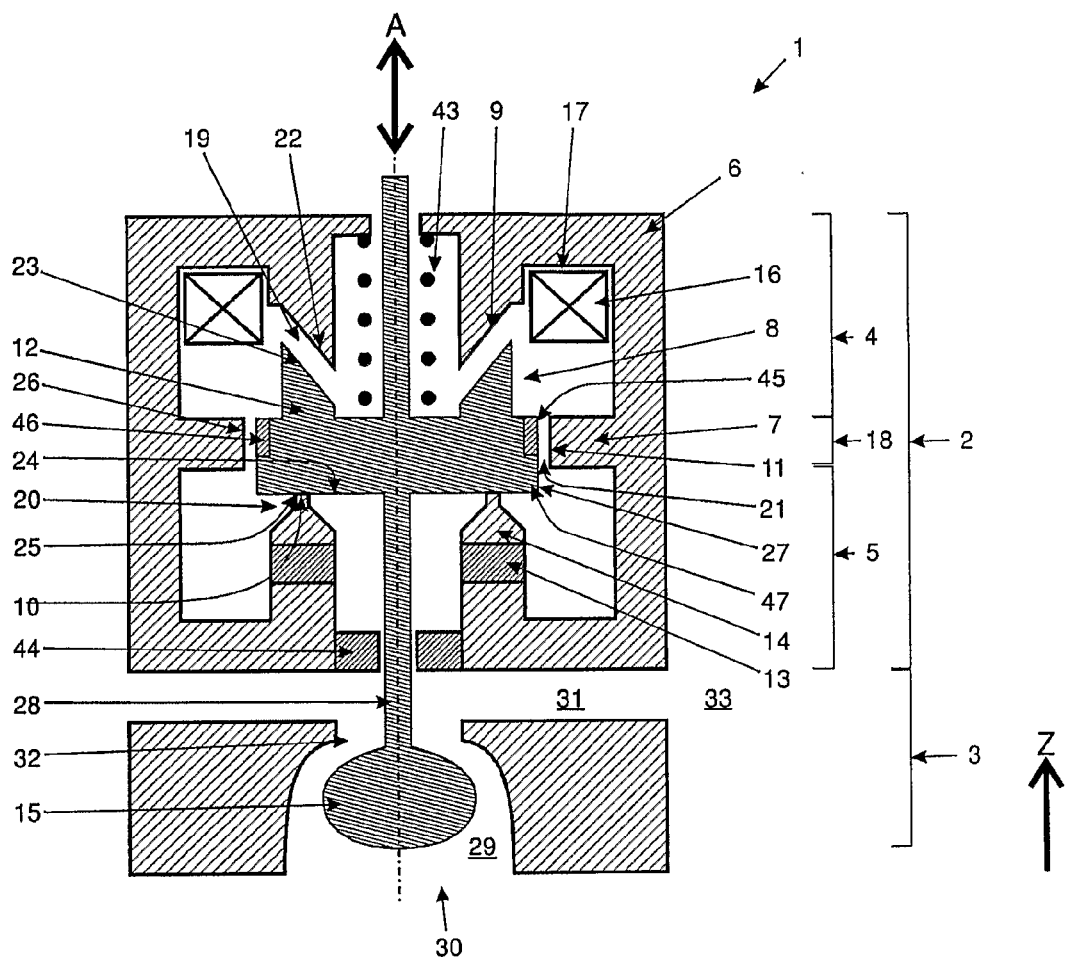
FIG. 1: is a cross section through a first embodiment of a valve unit, comprising a first embodiment of a valve actuator.

In FIG. 1, a schematic cross section through a valve unit 1, comprising a valve actuator section 2 and a valve orifice section 3 is shown. The valve unit 1 is essentially rotationally symmetric.

In the valve actuator section 2 a magnetic core 6 is provided. The magnetic core 6 is essentially made of a soft magnetic material, showing ferromagnetic properties. The magnetic core 6 is provided with a bifurcating web 7, which is circumferentially arranged on the inside of the magnetic core 6. In the embodiment shown in FIG. 1, the bifurcating web 7 lies roughly at half height of the magnetic core 6. The bifurcating web 7 defines an upper portion 4 and a lower portion 5 of the magnetic core 6. Of course, the position of the bifurcating web 7 can be chosen different as well.

The magnetic core 6 is provided with an interspace 8. The interspace 8 is defined by three neighboring edges 9, 10, 11 of the magnetic core 6. The first edge 9 forms part of the upper portion 4 of the magnetic core 6, while the second edge 10 forms part of the lower portion 5 of the magnetic core 6. The third edge 11 corresponds to the bifurcating web 7 (functioning as a bifurcating branch) and is common to both the upper portion 4 and the lower portion 5 of the magnetic core 6. Inside the interspace 8 an armature 12 is movably arranged (movable in the direction of arrow A, and functioning as a moveable magnetic component). The magnetic core 6 and the armature 12 are dimensioned in a way that the armature 12 is essentially only movable in the said direction, i.e. upwards and downwards (see arrow A). Most parts of the armature 12 are manufactured from a magnetic material (for example a soft magnetic material, which can be the same material as the material of the magnetic core 6). The armature 12 essentially closes the magnetic loop of the upper portion 4 of the magnetic core 6 and of the lower portion 5 of the magnetic core 6. This can be of course seen in a way that the armature 12 essentially closes the outer loop of the magnetic core 6 which bypasses the bifurcating web 7, as well. The typical travelling distance for the armature 12 in the said direction is 2, 3, 4 or 5 millimeters.

The armature 12 is connected to the valve poppet 15 via valve stem 28. The valve poppet 15 is arranged within a distribution chamber 29 of the valve unit 1. A fluid input line 30 and a fluid output line 31 connect to the distribution chamber 29. The entrance port 32 of the fluid input line 30 can be opened and closed by an appropriate movement A of valve poppet 15. The fluid input line 30 can, for example, be connected to the pumping cavity 38 of a cylinder 39 of synthetically commutated hydraulic pump 34 (see FIG. 7). The fluid output line 31 can be connected to the low pressure fluid reservoir 33 of a cylinder 39 of the synthetically commutated hydraulic pump 34. Therefore, the fluid output line 31 of the valve unit 1 will be the feeding line for the cylinder 39. The pressurized fluid (wherein a pressurization of the fluid within the pumping cavity 38 during an inward movement of piston 40 into the pumping cavity 39 will only occur when the valve unit 1 is closed) will exit the pumping cavity 38 through high pressure lines 36 towards a high pressure fluid manifold 35). In the respective high pressure lines 36, check valves 37 are provided near each cylinder 39.

Figure 2A:
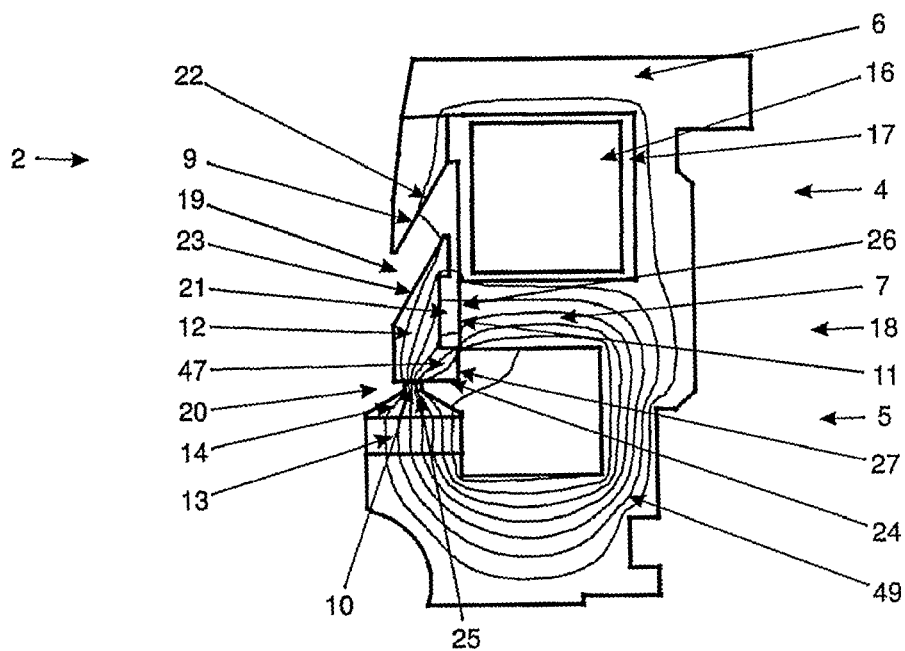
FIG. 2 a, b: shows the magnetic situation of the first embodiment of a valve actuator in its latched position.

In the lower portion 5 of the magnetic core 6, a ring shaped permanent magnet 13 is present (functioning as a permanent magnetic field generating device). Preferably the permanent magnet 13 is made of a metal ceramic material, showing a high magnetic flux per unit volume of the permanent magnet 13. On one side of the permanent magnet 13 a flux concentrator 14, made of a soft magnetic material (for example the same material as the magnetic core 6) is mounted (functioning as a magnetic flux concentrating device). The flux concentrator 14 faces the armature 12 and even comes into contact with the armature 12, when the armature 12 is in its lower position (open position of the valve unit 1). This position is shown in FIG. 1. This position of the armature 12 is called the latched position of the armature, because the armature 12 remains in this position, if no electric current and/or no external force is applied to the valve actuator section 2. Of course, if a sufficiently high force is exerted on the valve poppet 15, the armature 12 may come out of contact with the flux concentrator 14. For typical designs of the valve unit 1, however, the necessary force for unlatching the armature 12 will be chosen to be somewhere between 50 N and 100 N. Of course, the interval may also start/end at 60, 70, 80 and 90 N. The magnetic loop, generated by the permanent magnet 13 will essentially flow through the lower portion 5 of the magnetic core 6 and the armature 12. The resulting magnetic field will be further explained with reference to FIG. 2.

In the upper portion 4 of magnetic core 6, an electric coil 16 is provided (functioning as a variable magnetic field generating device). The electric coil 16 is placed into the inner space 17 of the upper portion 4 of the magnetic core 6. By applying electric current to the electric coil 16 (connecting wires are not shown), the electric coil 16 can generate a magnetic flux in the magnetic core 6. If the magnetic flux produced by the electric coil 16 is low, the magnetic flux of the electric coil 16 will be essentially confined to the upper portion 4 of the magnetic core 6. The same applies, if the direction of the magnetic field, produced by the electric coil 16 lies in the same direction as the magnetic field, produced by the permanent magnet 13 (for example, both magnetic fields, produced by electric coil 16 and permanent magnet 13 flow counterclockwise), even at higher levels of the magnetic flux. Of course, even here there is still a certain limit to the magnetic flux. However, if the magnetic field produced by the permanent magnet 13, and the magnetic field, produced by the electric coil 16, lie in different directions (for example, the magnetic field of the permanent magnet 13 circles in counterclockwise direction, where the magnetic field of the electric core 16 circles in a clockwise direction), at least portions of the middle magnetic bridge 18, formed by the bifurcating web 7 and the armature 12, will eventually become saturated, when a certain threshold level of the magnetic flux, produced by the electric coil 16, is reached or even exceeded. The saturated portions are preferably those most closely associated with the third gap 21, or indeed immediately adjacent to said third gap 21. Once this saturation in portions of the middle magnetic bridge 18 occurs, the incremental reluctance of the magnetic bridge 18 will be much higher than it was before saturation occurred. The total flux due to the electric coil 16 and the permanent magnet 13 is therefore effectively limited by the marked increase in incremental reluctance of the saturated portions. If the current in the electric coil 16 continues to increase, this will tend to cause an increase in the demagnetising field across the permanent magnet 13, rather than an increase in flux in the bifurcating web 7, because the incremental reluctance of the saturating portion of this web 7 is greatly increased above the saturation limit. The increasing demagnetising field across the permanent magnet 13 will act to reduce the flux flowing through the permanent magnet 13, and hence the flux concentrator 14, and hence reduce the retaining force on the armature 12. Another way to consider the effect is that further flux from the electric coil 16 will cause the magnetic flux exceeding the magnetic flux limit of the magnetic bridge 18 to follow the longer path through the lower portion 5 of the magnetic core 6. The magnetic flux of the electric coil 16 and the magnetic flux of the permanent magnet 13 point in different directions, thus counteracting each other. This will result in a reduced overall magnetic flux through the second gap 20, resulting in a reduced attractive force across second gap 20. At some point, the magnetic flux from by the permanent magnet 13 will be cancelled. This situation will be further explained with reference to FIGS. 3, 4, 5 and 6. Of course, only the overall magnetic flux at a certain point can be measured. The given picture of the superposition of different magnetic fluxes is simply a possible way for understanding the effects.

As can be seen from FIG. 1, in the lower position of the armature 12 (open position of valve unit 1), a first gap 19 is present between the first edge 9 and the armature 12. The first gap 19 is defined by the neighboring surface 23 of the armature 12 and the surface 22 of the first edge 9. In the embodiment of the valve unit 1, shown in FIG. 1, the gap 19 is inclined or tapered relative to the moving direction A of the armature 12. This incline of the first gap 19 increases the surface areas of the neighbouring surfaces 22, 23. The increased surface areas 22, 23 will result in an increased magnetic flux in the vicinity of the first gap 19. The incline also reduces the perpendicular distance between the neighbouring surfaces 22, 23, for a given required movement along the moving direction A of the armature 12, thereby reducing the reluctance of the gap 19 and increasing the magnetic flux through said gap 19 (thereby functioning as a magnetic flux enhancing means). In these ways, it is possible to enhance the overall magnetic flux which can pass through the first gap 19. Thus the resistivity of the first gap 19 towards the penetration of the magnetic field lines is lowered. In other words, the inclined first gap 19 is used to increase the overall magnetic flux which may run through the first gap 19 and therefore the overall magnetic flux which may run through the corresponding parts of the magnetic core 6 in its upper portion 4. Using such an inclined or tapered gap 19 is a well-known practice carried out to improve the strength of the magnetic attraction of long-stroke solenoids. However, in the valve unit 1 the inclined gap 19 also provides for a much faster operation, by decreasing the reluctance of said gap 19, therefore increasing the rate that magnetic flux through the bridge (interspace) 8 builds up, therefore decreasing the time to saturation of the bridge 8 portions adjacent to the third gap 21.

The opening movement of the valve unit 1 can be effectuated by two different forces, which can also act together. Firstly, an opening movement can be performed by magnetic attraction across the second gap 21, caused by the permanent magnet 13. Secondly, a spring 43 (functioning as a mechanical energy storage device) is provided, which forces the valve stem 28 downwards, therefore opening the valve unit 1. If both forces are applied together, the response time of the valve unit 1 will increase and the opening time of the valve unit 1 will decrease.

The valve stem 28 (including the armature 12) is guided by bearings 44, 45. A first bearing 44 is arranged near the distribution chamber 29 of the valve unit 1. This first bearing 44 can be arranged as a standard, fluid-proof translational bearing 44.

The second bearing 45 is provided by the outer surface 27 of the armature 12 and the inner surface 26 of the bifurcating web 7. In other words, the third gap 21 is designed to perform the function of a translational bearing 45 as well. Because the magnetic material of the armature 12 in the presently shown embodiment of a valve unit 1 has a step like extension 47, a ring 46 made out of a non-magnetic material is arranged around the upper half of the armature 12 to form a smooth surface 27, neighboring the opposing surface 26 of the bifurcating web 7 of the third gap 21.

Due to the design of the armature 12, where the magnetic material of the armature 12 shows an extension 47 in an area which is neighboring the third gap 21, magnetic saturation of the magnetic bridge 18 (in particular of bifurcating web 7 and/or extension 47, functioning together as a magnetic flux limiting means) will occur if the electric coil 16 is supplied with enough electric current. Therefore, the electric current, which is necessary to cancel the magnetic field of permanent magnet 13, can be determined by the size and shape of the magnetic bridge 18 (in particular of the bifurcating web 7 and/or the extension 47). The design can be chosen according to the design parameters of the resulting valve actuator 1. The early saturation of the magnetic bridge 18 occurs because the surface overlap between the outer surface part 27 of the extension 47 of the magnetic material of the armature 12 and the surface 26 of the bifurcating web 7 is only very small in the closed position of the valve unit 1.

Once the armature 12 starts to move upwards (arrow A) the surface overlap between the surface part of extension 47 and the surface 26 of bifurcating web 7 will increase. Therefore, the saturation of the magnetic bridge 18 will now occur at a higher magnetic flux. This, in turn, will decrease the reluctance of the saturated portions of the magnetic bridge 18. An increasing magnetic flux generated by the electric coil 16 will go through the magnetic bridge 18. Therefore, the attracting force between the surface 22 of the first edge 9 and the surface 23 of the armature 12, defining the first gap 19, will increase. Therefore, the armature 12 and the valve stem 28, which is connected to the valve poppet 15, will accelerate very fast to the closed position of the valve unit 1.

In FIGS. 2-6, the change of the magnetic fields during the opening movement of the valve unit 1 is further elucidated. FIGS. 2-6 show only a part of the parts involved (essentially a part of the magnetic core 6 and a part of the armature 12).

In FIG. 2, the situation of the magnetic field in an idle state of the valve actuator 2 is shown. Here, the electric coil 16 is switched off, i.e. no electric current is applied to the electric coil 16. The magnetic flux only comes from the permanent magnet 3. The magnetic flux density in different parts of the valve unit 1 can be inferred from the density of the magnetic flux lines 49. Note that the number of field lines does not indicate the overall level of magnetic flux, so it is not possible to compare absolute levels of flux from one drawing to another.

As can be seen from FIG. 2, the magnetic flux is concentrated at the second gap 20, which is defined by the contacting surface 25 of the magnetic flux concentrator 14 and the neighbouring surface 24 of the armature 12. This generates a downward force on the armature 12. The magnetic flux is also concentrated at the third gap 21, and therefore also in the part of the extension 47 immediately adjacent to the third gap 21 and the part of the bifurcating web 7 immediately adjacent to the third gap 21. The magnetic bridge 18 is not saturated, and therefore the magnetic flux through the bifurcating web 7 is not hindered. Therefore, the magnetic flux is essentially concentrated to the lower portion 5 of the magnetic core 6. Only a very small fraction of the magnetic flux will take the "long path" via the upper portion 4 of the magnetic core 6.

Figure 2B:
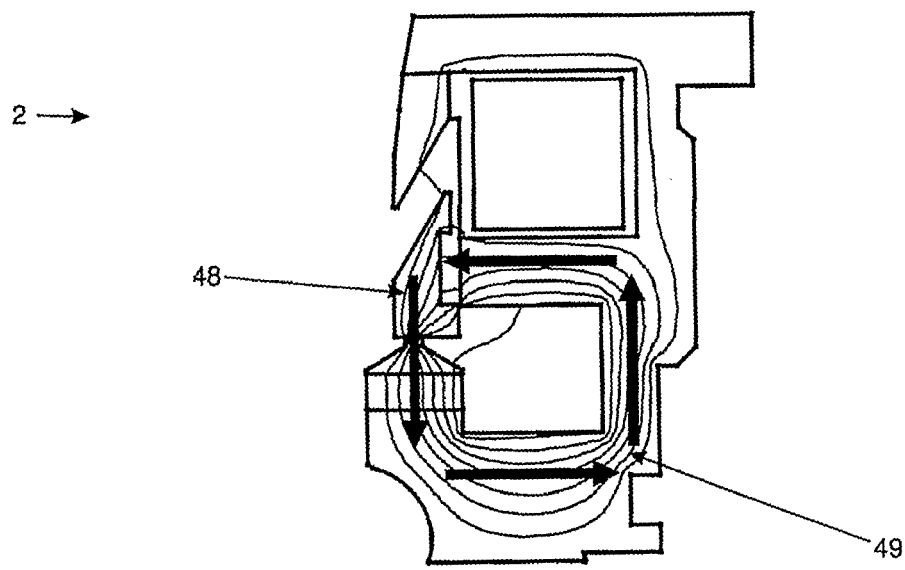
Figure 3A:
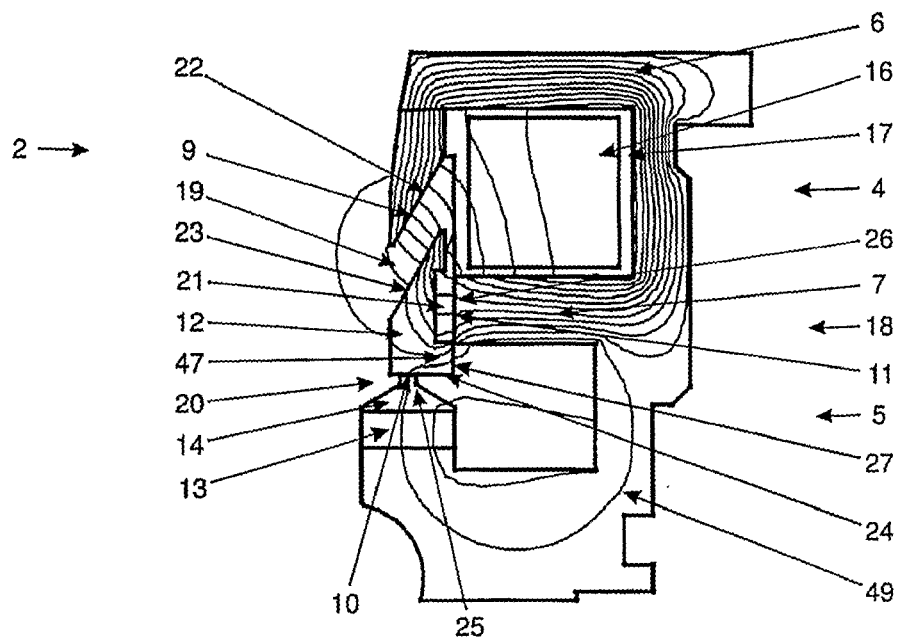
FIG. 3 a, b: shows the magnetic situation of the first embodiment of the valve actuator at the initial phase of a delatching movement.
Figure 3B:
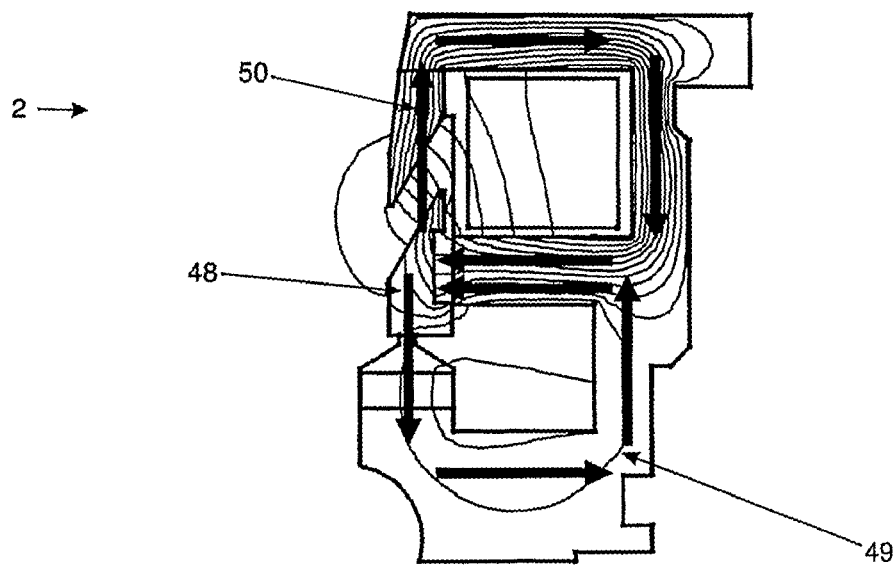

In FIG. 2b (as opposed to FIG. 2a), directional arrows 48 are drawn, indicating the direction of the magnetic flux, being produced by the permanent magnet 13.

The situation changes when the electric coil 16 is switched on, i.e. when an electric current is applied to the electric coil 16. Now, both the electric coil 16 and the permanent magnet 13 are producing a magnetic flux 48, 50 (see FIG. 3b). As indicated by the direction of the arrows 48, 50, the direction of the magnetic flux 48, produced by the permanent magnet 13, and the magnetic flux 50, produced by the electric coil 16, point in the same direction within the magnetic bridge 18. However, the resulting magnetic flux is at a level exceeding the saturation level of the magnetic bridge 18 (the bifurcating web 7 and/or the extension 47). I.e., the magnetic material of the bifurcating web 7 and/or of the extension 47 of the armature 12 is saturated. Thus, the two magnetic fluxes 48, 50 will "compete" with each other. Therefore, the resulting magnetic flux through the second gap 20 will drop to almost zero at some point, which can be seen from the density of magnetic flux lines 49 in the lower portion 5 of the magnetic core 6 (see in particular FIG. 3a). This causes the second gap 20 to temporarily demagnetize, thus almost completely cancelling the downward force on armature 12. On the other hand, the magnetic flux going through first gap 19 between armature 12 and first edge 9 of magnetic core 6 in the upper portion 4 of magnetic core 6 will generate an upward force on armature 12. Therefore, the valve 1 will start to close.

Figure 4:
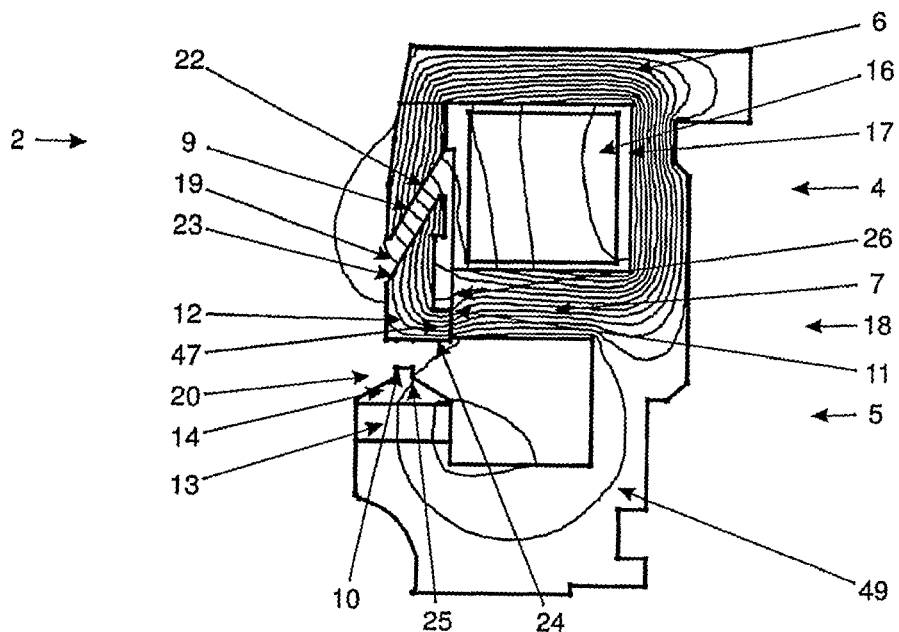
FIG. 4: shows the magnetic situation of the first embodiment of a valve actuator in a half delatched position.

In FIG. 4, the valve unit 1 is already halfway closed. As can be seen from FIG. 4, the overlapping surface part of the neighboring surface 26 of extension 47 of armature 12 and of the surface 27 of bifurcating web 7 (third gap 21) has already increased. Therefore, the saturation level of the magnetic bridge 18 (bifurcating web 7 and/or extension 47) is now much higher as compared to the situation in FIGS. 2 and 3. Hence, the reluctance of the third gap 3 towards a penetration of magnetic field lines reduces. Therefore, the effectiveness of the electric coil 16 increases. This higher effectiveness can be seen from the higher density of magnetic field lines 49 in the upper portion 4 of the magnetic core 6.

Figure 5:
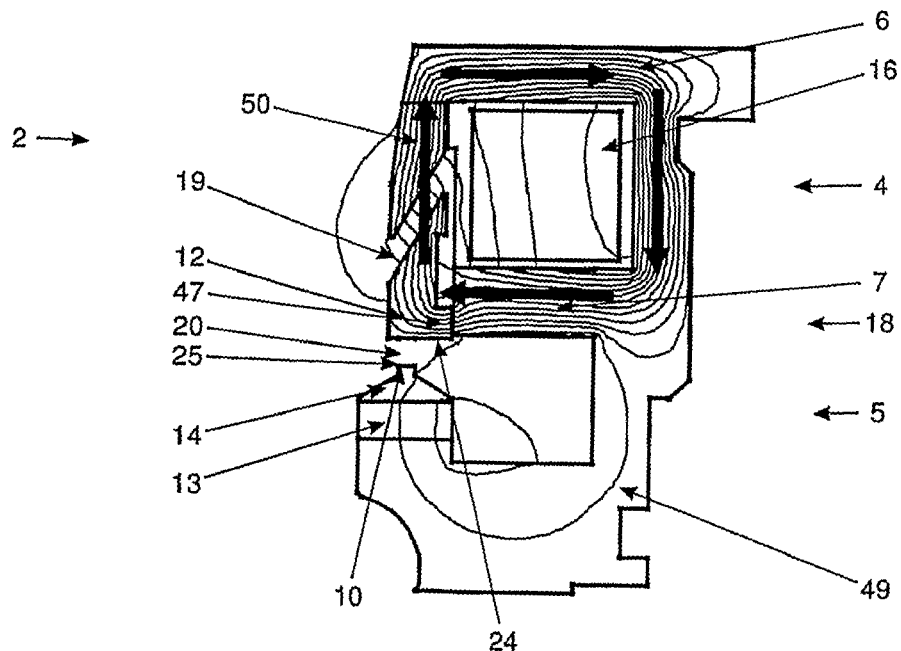
FIG. 5: shows the magnetic situation of the first embodiment of a valve actuator in its delatched position.

Finally, in FIG. 5, the armature 12 reaches its upper end position, in which the valve unit 1 is fully closed. In this position, the first gap 19 between the first edge 9 of the magnetic core 6 and the armature 12 is essentially closed. On the other hand, the second gap 20 between the neighboring surface 24 of armature 12 and surface 25 of magnetic flux concentrator 14 is now fully opened. In this position valve unit 1 can be kept in its closed position, even if the electric current through electric coil 16 is reduced. This even holds, if the mechanical force of spring 43 is considered.

Figure 6:
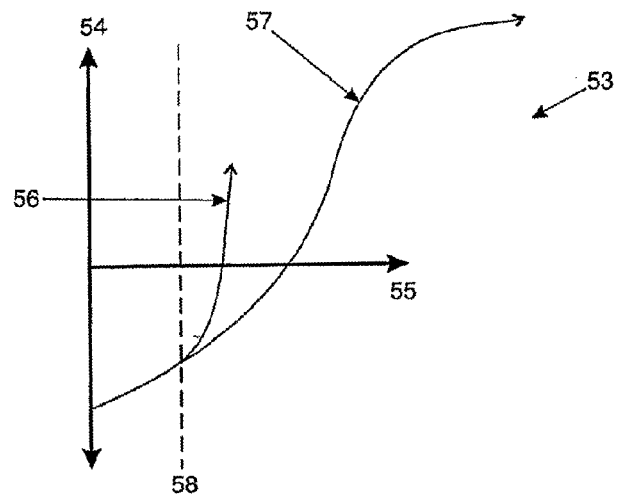
FIG. 6: shows the magnetic saturation of the magnetic bridge in the first embodiment of a valve actuator.

In the Graph 53, shown in FIG. 6, the functionality between the overall force $F_M$ on the armature 12 and the current I through the electric coil 16 is depicted. The overall force $F_M$ is shown on the ordinate 54, while the electric current I is shown on the abscissa 55. The overall magnetic force $F_M$ consists essentially of the magnetic force across the first gap 19 and the magnetic force across the second gap 20. The overall magnetic force $F_M$ is essentially the vectorial sum of said forces. In particular, the force exerted by the spring 43 is not part of the overall magnetic force $F_M$.

In the Graph 53, the functional connection between overall magnetic force $F_M$ and electric current I is shown for valve actuator 2 comprising a magnetic flux limiting means (see saturation line 56). This functional connection 56 occurs at the valve actuators 2, depicted in FIGS. 1 and 8. For comparison, also no-saturation line 57 is shown, where no saturation occurs. This corresponds to the valve actuator as shown in U.S. Pat. No. 7,077,378 B2, for example.

At very low currents I the saturation line 56 and the no-saturation line 57 fall together. However, when crossing the saturation limit 58 the core, the force $F_M$, holding armature 12 in its latched position (negative values of the overall magnetic force $F_M$ move the armature 12 downwards) decays much more rapidly as compared to the non-saturation case 57. Therefore, the point where the saturation line 56 crosses the abscissa 55 lies at a considerably lower electric current I, as compared to the non-saturation case 57. This crossing point of the respective line 56, 57 and the abscissa 55 corresponds to the point, where the armature 12 begins to move to its upper position, thus closing the entrance port 32 (in case of the valve unit 1 shown in FIG. 1). This way, in the saturation case less electric energy is needed for the actuation of the valve unit, resulting in higher efficiency of the valve unit 1, 51.

Another effect can be inferred from the Graph 53 as well. As it is clear from the Graph 53, the saturation line 56 shows a much higher incline when crossing the abscissa 55, as compared to the no-saturation line 57. The area around the abscissa 55, however, corresponds to a situation, where a relatively small external force or residual magnetization of the magnetic core 6 and/or the armature 12 can hold the armature 12 in its current position or, contrary to this, can initiate a movement of the armature 12. Therefore, in this region fluctuations can occur. Due to the steeper incline of the saturation line 56, the width of the time interval creating this "area of uncertainty" will be much smaller as compared to the state of the art, resulting in a much better timing of the resulting valve actuator 2.

Figure 7:
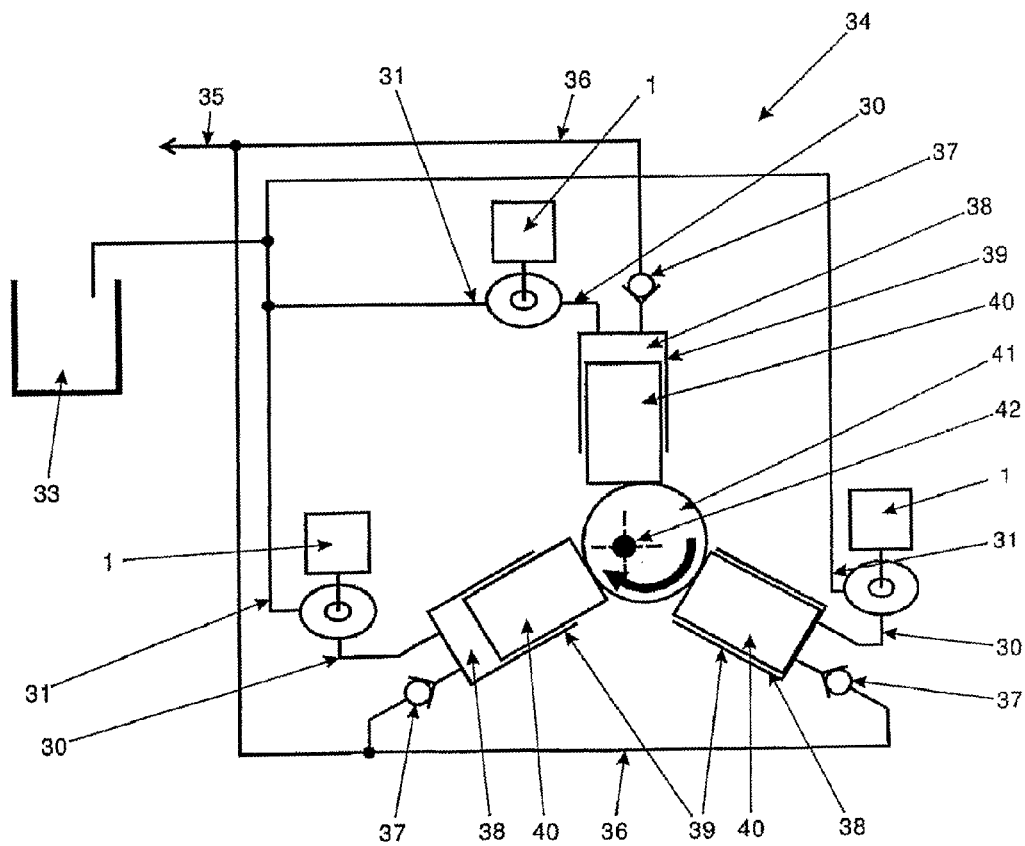
FIG. 7: is an embodiment of a synthetically commutated hydraulic pump, using a valve unit according to FIG. 1.

In FIG. 7, a synthetically commutated hydraulic pump 34, using the valve unit 1 of the previously described design is used. The synthetically commutated hydraulic pump 34 shows altogether three cylinders 39. Each cylinder 39 comprises a pumping cavity 38 and a cylinder 40, reciprocating in and out of the respective pumping cavity 38. The movement of the pistons 40 is effectuated by a cam 41, being eccentrically mounted on a rotating shaft 42. When a piston 40 moves out of its corresponding pumping cavity 38, hydraulic fluid is sucked into the pumping cavity 38 from a low pressure reservoir 33 through the valve unit 1 (the valve unit 1 is in its open position). As soon as the piston 40 has reached its bottom dead center, the valve unit 1 can be closed. Therefore, the pressure of the fluid within the pumping cavity 38 increases. Eventually, the fluid opens the check valve 37 and hence the hydraulic fluid is expelled out of the pumping cavity 38 through the check valve 37 to the high pressure manifold 35 of the synthetically commutated hydraulic pump 34. This is equivalent to the so called full stroke pumping mode.

However, it is also possible to delay the closing of valve unit 1. If valve unit 1 is closed at a later time, the fluid within the pumping cavity 38 is initially expelled back through the valve unit 1 into the low pressure fluid reservoir 33. Therefore, no effective pumping towards the high pressure fluid manifold 35 is performed. Only once the valve unit 1 is closed, the remaining fraction of the hydraulic fluid within the pumping cavity 38 is expelled towards the high pressure fluid reservoir 35. Therefore, the pumping performance of synthetically commutated hydraulic pump 34 can be easily adapted to the actual high pressure fluid flow requirements.

Figure 8:
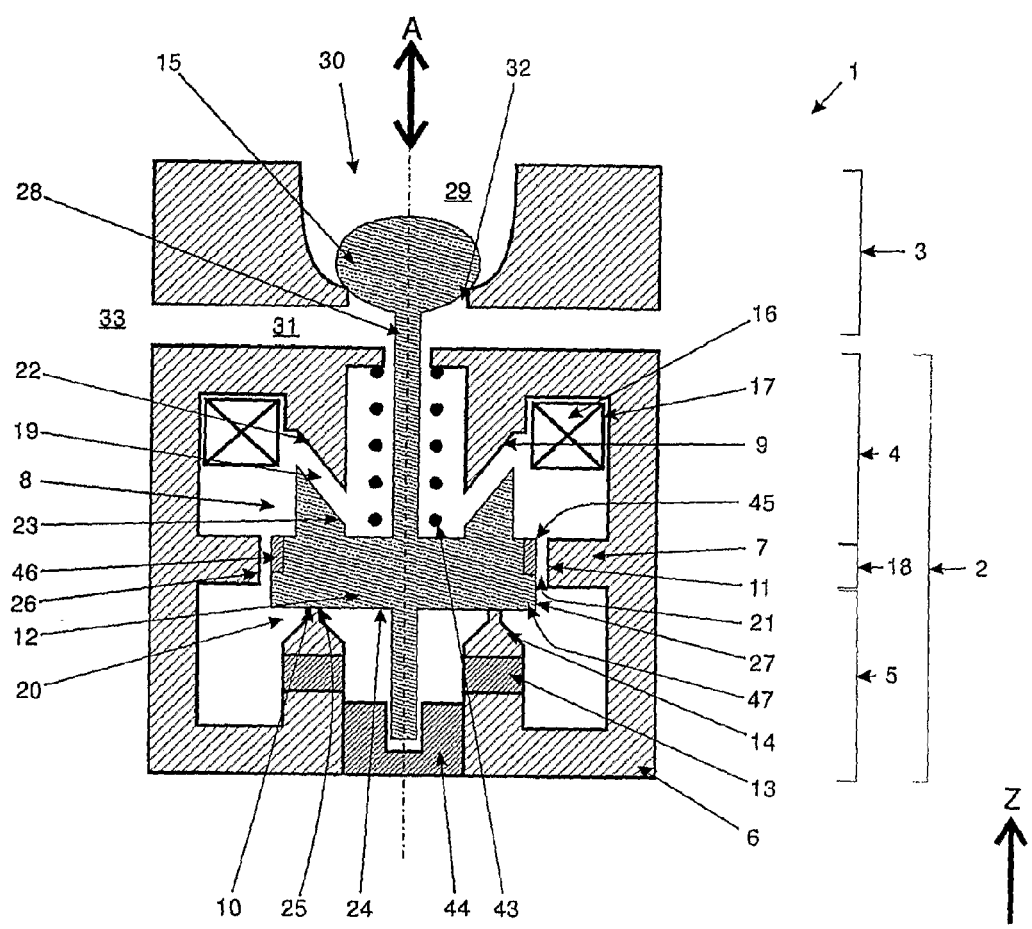
FIG. 8: is a cross section through a second embodiment of a valve unit, comprising the first embodiment of a valve actuator.

Finally, in FIG. 8, another possible embodiment of valve unit 51 is shown. The valve actuator part 2 of the valve unit 51 is almost identical to the valve actuator part 2 of the valve unit 1 shown in FIG. 1. The main difference between both valve units 1, 51 of FIG. 1 and FIG. 8 is that the valve orifice section 52 of the presently shown valve unit 51 is designed in a way that in the latched position of the valve actuator 2, the valve orifice 32 of the valve orifice section 52 is closed. Consequently, the valve orifice 32 of the valve orifice section 52 is open, when the valve actuator 2 is in its upper position.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A valve actuator comprising:
   a magnetic core forming an interspace and having at least one bifurcating branch disposed within the interspace and defining a first region and a second region of said magnetic core,
   at least one variable magnetic field generating device having its coil disposed in said first region of said magnetic core,
   at least one permanent magnetic field generating device disposed in said second region of said magnetic core, and
   at least one movable magnetic component movably arranged within said interspace of said magnetic core with a first gap between a first surface of said movable magnetic component and a first surface of said interspace of said magnetic core, a second gap between a second surface of said movable magnetic component and a second surface of said interspace of said magnetic core, and a third gap between a third surface of said movable magnetic component and a third surface of said bifurcating branch of said magnetic core,
   wherein a magnetic flux generated by the coil of the at least one variable magnetic field generating device disposed in the first region exerts a force on said at least one movable magnetic component that overcomes a magnetic flux generated by the at least one permanent magnetic field generating device, and
   wherein the at least one bifurcating branch is a magnetic flux limiting means whose magnetic flux limit can at least be reached by the at least one variable magnetic field generating device.

2. The valve actuator according to claim 1, wherein an extension of said at least one movable component includes the third surface of said movable magnetic component and forms a variable magnetic flux limiting means having a variable magnetic flux limit; and
   wherein a combined magnetic flux limit of the magnetic flux limiting means and the variable magnetic flux limiting means can at least be reached by the at least one variable magnetic field generating device.

3. The valve actuator according to claim 2, wherein a magnetic reluctance of said third gap changes with a position of said at least one movable magnetic component.

4. The valve actuator according to claim 3, wherein the magnetic reluctance of said third gap is higher when the at least one movable magnetic component is closer to said second gap.

5. The valve actuator according to claim 2, wherein the variable magnetic flux limiting means is arranged solely in said first region of said magnetic core.

6. The valve actuator according to claim 1, wherein said at least one magnetic flux limiting means is arranged in connection with said third gap.

7. The valve actuator according to claim 1, wherein at least one magnetic flux concentrating device is arranged in the proximity of at least one of said gaps or said magnetic flux limiting means.

8. The valve actuator according to claim 7, wherein at least one of said magnetic flux concentrating device and said magnetic flux limiting means includes shaping at least one of the components of the valve actuator.

9. The valve actuator according to claim 7, wherein at least one magnetic flux concentrating device is arranged in the proximity of said second gap.

10. The valve actuator according to claim 7, wherein at least one magnetic flux concentrating device is arranged in the proximity of said third gap.

11. The valve actuator according to claim 1, wherein the surfaces bounding at least one of said gaps comprise at least one magnetic flux enhancing or magnetic flux density reducing means.

12. An actuated valve, comprising a valve actuator according to claim 1, wherein the at least one movable magnetic component is connected to or part of a valve orifice changing device.

13. A fluid working machine comprising at least one actuated valve having a valve actuator according to claim 1, wherein said fluid working machine is a synthetically commutated hydraulic machine.

14. A method of operating a valve actuator comprising a magnetic core with an interspace, the magnetic core having at least one bifurcating branch disposed within the interspace defining a first region and a second region of said magnetic core, at least one variable magnetic field generating device having its coil disposed in said first region of said magnetic core, at least one permanent magnetic field generating device disposed in said second region of said magnetic core and at least one movable magnetic component, said movable magnetic component being movably arranged within said interspace of said magnetic core with a first gap between a first surface of said movable magnetic component and a first surface of said interspace of said magnetic core and a second gap between a second surface of said movable magnetic component and a second surface of said interspace of said magnetic core, the method comprising:

generating, by the at least one permanent magnetic field generating device disposed in said second region of said magnetic core, a magnetic flux; and overcoming the magnetic flux by the at least one variable magnetic field generating device having its coil disposed in said first region of said magnetic core through a limitation of magnetic flux through part of at least one of said magnetic core and said movable magnetic component.

15. The method of operating a valve actuator according to claim 14, wherein an amount of limitation of said magnetic flux is at least in part variable.

16. The method of operating a valve actuator according to claim 15, wherein an extension of the movable component includes the third surface of said movable magnetic component and forms a variable magnetic flux limiting means having a variable magnetic flux limit; and wherein the amount of limitation of said magnetic flux changes with a position of said movable magnetic component.

17. The method of operating a valve actuator according to claim 14, wherein the magnetic core has at least one bifurcating branch disposed within the interspace defining a first region and a second region of said magnetic core, wherein the at least one variable magnetic field generating device is associated with said first region of said magnetic core, wherein the at least one permanent magnetic field generating device is associated with said second region of said magnetic core, and wherein the at least one movable magnetic component has a third gap between a third surface of said movable magnetic component and a third surface of said bifurcating branch of said magnetic core, and wherein the at least one bifurcating branch is a magnetic flux limiting means, the method further comprising:

reaching a magnetic flux limit of the magnetic flux limiting means by the variable magnetic field generating device.

\* \* \* \* \*

UNITED STATES PATENT AND TRADEMARK OFFICE
CERTIFICATE OF CORRECTION

| | | |
|---|---|---|
| PATENT NO. | : 9,033,309 B2 | Page 1 of 1 |
| APPLICATION NO. | : 13/126631 | |
| DATED | : May 19, 2015 | |
| INVENTOR(S) | : William Hugh Salvin Rampen et al. | |

It is certified that error appears in the above-identified patent and that said Letters Patent is hereby corrected as shown below:

ON THE TITLE PAGE

Please replace the Assignees listed on the patent, namely,

Sauer Danfoss Aps, Nordborg (DK);
    Artemis Intelligent Power Ltd., Loanhead (GB)

To read

Danfoss Power Solutions Aps   Nordborg (DK);
    Artemis Intelligent Power Ltd.   Loanhead (GB)

Signed and Sealed this
Twelfth Day of April, 2016

Michelle K. Lee
*Director of the United States Patent and Trademark Office*